United States Patent [19]

Ström

[11] Patent Number: 4,558,325
[45] Date of Patent: Dec. 10, 1985

[54] BI-AXIAL SUPPORTING ARRANGEMENT WHICH CAN WITHSTAND HIGH ACCELERATION FORCES

[75] Inventor: Johan P. Ström, Järfälla, Sweden

[73] Assignee: U.S. Philips Corporation, New York, N.Y.

[21] Appl. No.: 441,184

[22] Filed: Nov. 12, 1982

[30] Foreign Application Priority Data

Nov. 13, 1981 [SE] Sweden ................... 8106754

[51] Int. Cl.⁴ ............................................... H01Q 3/08
[52] U.S. Cl. .................................... 343/765; 74/5.7; 244/3.16
[58] Field of Search ................. 343/757–766, 343/705, 882; 244/3.14, 3.16, 3.19; 248/583, 602; 74/5 R, 5.22, 5.7, 5.6 B, 5.43, 1 R

[56] References Cited

U.S. PATENT DOCUMENTS

| 3,522,737 | 8/1970 | Brenot | 74/5 R |
| 3,898,668 | 8/1975 | Evans et al. | 343/765 |
| 3,920,200 | 11/1975 | Evans et al. | 244/3.16 |
| 4,009,848 | 3/1977 | Albert et al. | 244/3.16 |
| 4,085,910 | 4/1978 | Baker et al. | 244/3.16 |
| 4,267,988 | 5/1981 | Rodgers | 244/3.16 |
| 4,436,260 | 3/1984 | Donelan | 244/3.16 |

Primary Examiner—Eli Lieberman
Assistant Examiner—Michael C. Wimer
Attorney, Agent, or Firm—Robert S. Smith

[57] ABSTRACT

The invention relates to a bi-axial support of a rotatable body in a projectile for supporting said body such that it can perform small tilting motions about two mutually perpendicular axes lying in a plane, which is perpendicular to the longitudinal axis of the projectile. The support consists of a spherical or partly spherical bearing body introduced into a correspondingly spherical cup-shaped recess in a projectile-fixed part having the open end directed forwards in the motion direction of the projectile. The spherical bearing body is retained in the recess by means of two pairs of link arms defining two virtual tilting axes for the bearing body and connected to two output shafts such that a tilting motion of the body about the respective virtual axis results in a rotation of the respective output shaft and vice versa. When firing the projectile the spherical surface of the bearing body comes in metallic contact with the spherical surface of the recess, whereby the support can withstand very high acceleration forces in any direction.

8 Claims, 4 Drawing Figures

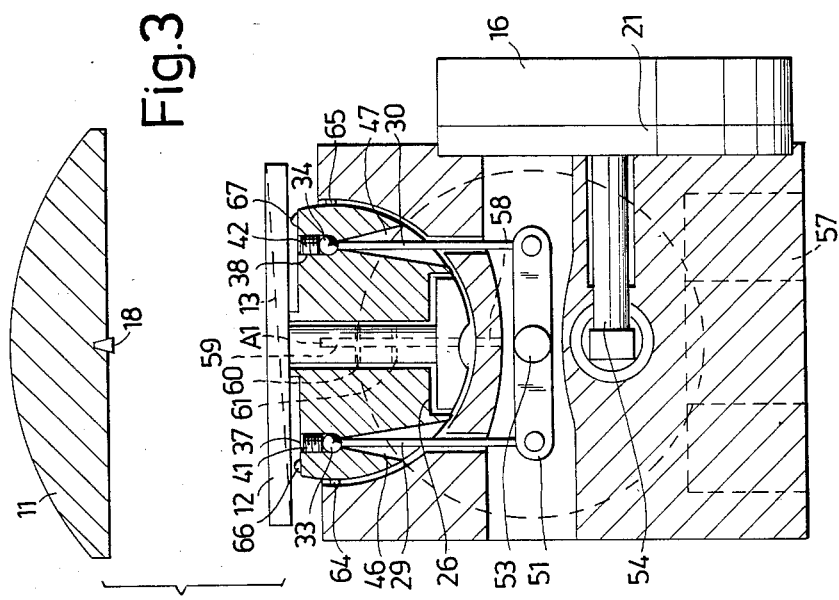
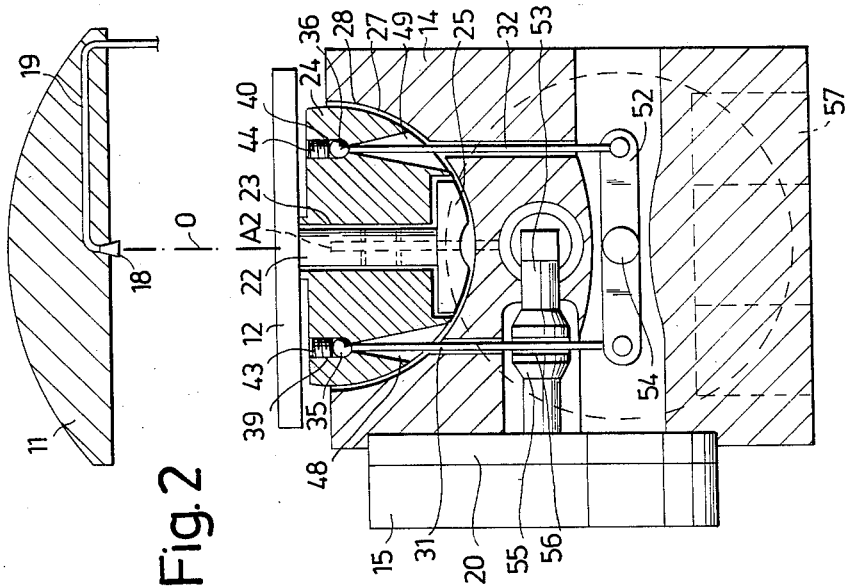

BI-AXIAL SUPPORTING ARRANGEMENT WHICH CAN WITHSTAND HIGH ACCELERATION FORCES

BACKGROUND OF THE INVENTION

The invention relates to an arrangement for bi-axial tiltable rotary support of a load rotor, such as an antenna, a plane mirror or the like for transmission/reception of electromagnetic radiation, in a projectile which during firing is exposed to large acceleration forces, such that the rotatable body can perform limited tilting or turning motions around two mutually perpendicular tilt axes lying in a plane which is substantially perpendicular to the longitudinal axis of the projectile, while the rotation axis of the body substantially coincides with the longitudinal axis of the projectile.

The rotor or rotatable body may as mentioned be an antenna, a plane mirror or the like, which can be included in a target tracking device and, after discovery of a target, adapted to be locked onto the target, whereafter the tracking device guides the projectile towards the target. During the search phase of this guiding procedure the antenna is caused to perform a scanning motion, for example a conical scanning, and for this purpose it must be tiltable around two mutually perpendicular axis. The rotation of the antenna then can have for its purpose, if the antenna axis is somewhat oblique relative to the rotation axis, to increase the chances for discovery of a target by increasing the effective illumination area. In certain systems a gyroscope is included, the rotor of which serves as a mirror for electro-magnetic radiation. Also in this case it is required that the body serving as rotor/mirror is bi-axially supported with an angular transducer arranged at each tilt axis. A common bi-axial support is the gimble support comprising two gimbal rings mounted in each other and each rotatable about its tilt axis, the inner ring supporting the rotatable body.

A special problem appearing in the case of journalling a body in a projectile is that the body and thereby the support is exposed to extremely high acceration forces, both axially and radially; the radical force due to the rotation in the fire tube. These forces are combined to a resulting force vector, which is directed in an indefinite angle obliquely backwards and which rotates together with the projectile. These circumstances in combination with the high acceleration forces involved have the effect that a gimbal support of known type cannot be used.

The object of invention is to produce a support which can withstand such extremely high acceleration forces composed of an axial and a radical component, which appear at the firing of a projectile, and which support is suitable both as supporting arrangement for a scanning antenna or reflector included in a target tracking device and of a rotor included in a gyroscope.

SUMMARY OF THE INVENTION

According to the invention this is achieved that the rotor or rotatable body is supported by a bearing body having spherical or partly spherical outer contour, which body is introduced into a correspondingly spherically cup-shaped recess in a projectile fixed part. The recess has an open end. The rotor is mounted on the bearing body which is introduced into the recess, directed forwards in the motion direction of the projectile and its bottom is directed backwards, so that upon firing contact is established between the spherical surfaces of the recess and the bearing body. The bearing body is connected to a projectile-fixed part via two pairs of link arms with substantial extension in the longitudinal direction of the projectile and with the link arms of each pair having one of their ends rotatably connected to the bearing body at two diametrically situated points of the body for defining a turning axis for the bearing body between said points, while the link arms of each pair with the opposite end are in motion transmission connection with an output shaft in such manner that rotation of the shaft is transferred to the body by longitudinal displacement of the link arms and vice versa, a drive motor and/or an angular transducer being arranged on each shaft.

In the construction according to the invention the real turning axis present in conventional supports have been replaced by virtual turning axes and the advantages achieved with the invention are related to the fact that those forces have been eliminated which in the known constructions are transferred to the real turning axes.

Because the bearing body during the acceleration phase lies with its spherical surface in metallic contact with the spherical recess the support will in practice withstand any accelerations regardless of how large they are and independently of what direction the resulting force vector has. The metallic contact during the acceleration phase of course involves that the rotatable body cannot function normally during this phase. But this is not necessary. The only thing that is important is that the support is not destroyed during the acceleration phase. As soon as the acceleration phase is terminated the projectile will be exposed to a deceleration, which persists during the remaining part of the travel against the target and the bearing body then automatically is lifted from the cup-shaped recess so that it is free to turn or tilt about the two vertical axes defined by the link arm system. It is then of importance that the turning can be effected with as little resistance as possible.

In order to facilitate the turning or tilting motion of the bearing body this body can according to another feature for the invention be air-journalled so that a channel terminates in the bottom of the recess. The channel has a connection with a compressed air source for maintaining an air gap between the spherical surfaces of the bearing body and the recess.

During firing the projectile is caused to rotate, this rotation decreases and possibly stops due to intentional braking during movement of the projectile through its trajectory. If the rotor body is supported with little frictional resistance in the bearing body the rotor can continue to rotate even if the projectile stops to rotate. Sometimes it may, however, be desirable to maintain a relatively rapid rotation of the body throughout the whole trajectory. An embodiment of the invention, where this is achieved and in which the load rotor or rotatable body is fixedly connected to a drive rotor running in a corresponding recess in the spherical surface of the bearing body, is characterized by the rotor at the side facing the spherical recess being provided with projections adapted to cooperate with a compressed air stream in the air gap between the spherical surfaces of the bearing body and the recess in order to maintain rotation of the rotatable body via the rotor.

In a preferred embodiment the projections on the outside of the rotor have the shape of helical grooves, in which case the air channel through which compressed air is applied terminates opposite center of the helical grove pattern in the rotor.

In order to facilitate the rotation of the rotatable body this body can also be air-journalled. An embodiment where this is the case and in which the rotatable body is journalled in the bearing body by means of a slide bearing consisting of a shaft running in a corresponding bore transversely through the bearing body and which shaft possibly is terminated by a rotor, is characterized by the shaft having an axially extending channel, which at one end emerges into the air gap between the spherical surfaces of the bearing body and the recess and at the other end emerges into the bore in order to maintain an air gap between the shaft and rotor and the surrounding parts of the bearing body.

The combination of air-drive of the rotatable body and air-journalling of both this body and the spherical bearing body forming the bi-axial support enables use of the device as a gyroscope having excellent gyroscopic properties due to the fact that the rotor as a result of the air driving easily can be brought to sufficient rotational speeds and the air journalling of the body results in that the gyroscopic deflections being minimally braked. If the output shafts, which via the link arm system are coupled to the bi-axially supported bearing body, are provided both with driving motors and angular transducers one and the same device can be used both as a scanning antenna or reflector and as gyroscope. It can consequently in a first phase of a projectile trajectory serve as a target tracking device with scanning antenna or reflector and in a later phase serve as a gyroscope with a reflector coupled to the gyroscope rotor.

BRIEF DESCRIPTION OF THE DRAWING

The invention is illustrated in the accompanying drawing.

FIGS. 2 and 3 are two mutually perpendicular sectional views through a reflector device supported in accordance with the invention.

DESCRIPTION OF THE PREFERRED EMBODIMENTS

Figure 1:
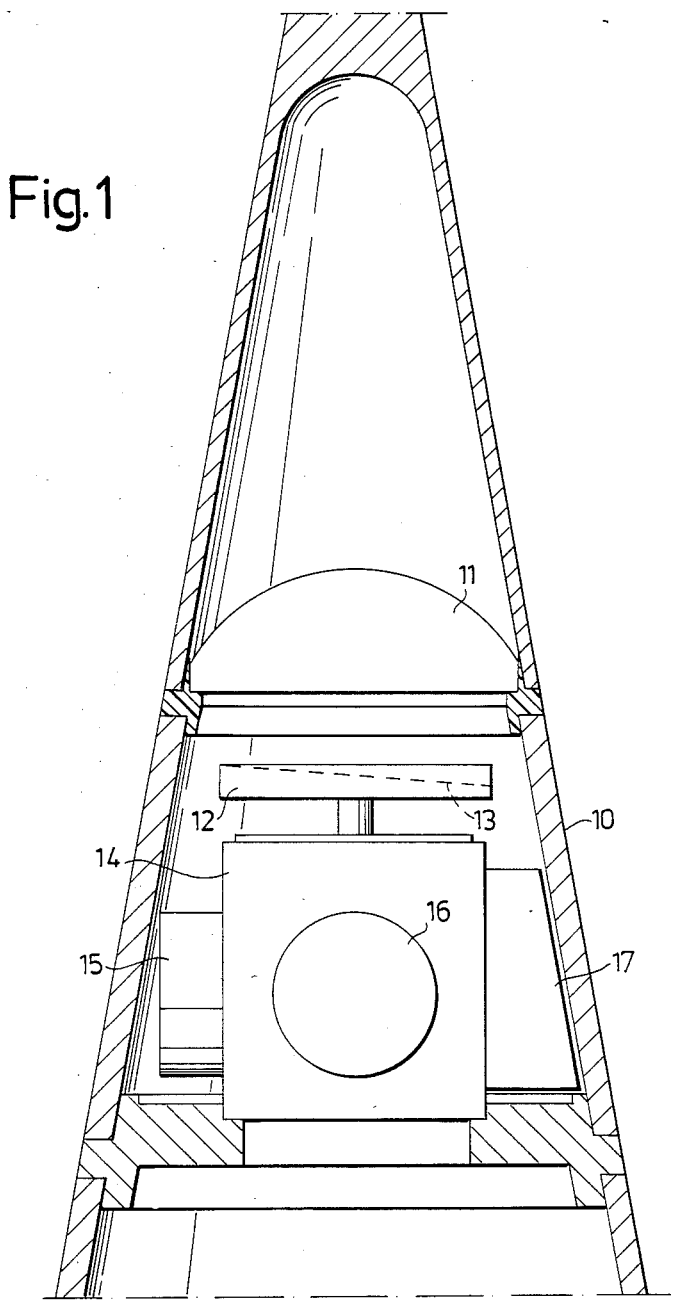
FIG. 1 is a section view through the nose of a projectile, where a controllable reflector device, which can be constructed in accordance with the invention, is mounted.
Figure 4:
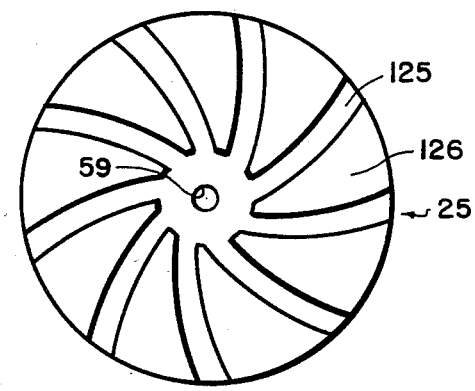
FIG. 4 is a bottom view at an enlarged scale, of the driver rotor of the device of FIGS. 1-3.

In FIG. 1 reference numeral 10 designates the envelope of a projectile, 11 is a lens for electromagnetic radiation, 12 is a rotatable mirror having an oblique reflection surface, 13, 14 is a supporting body for the mirror and other details, 15, 16 are two motors for adjusting the setting angle of the mirror in a bi-axial supporting arrangement and 17 is an electronic part comprising control circuits, i.e. for the control of the mirror. The mirror can be included in a target tracking system operating with electromagnetic radiation, such as IR radiation, the lens 11 then serving as collection lens both at transmission and reception. The sensitivity lobe is directed substantially forward but can be influenced by oblique setting of the mirror by means of the two motors for tilting the axis, about which the motor rotates, in two mutually perpendicular directions. The sensitivity lobe has a small lobe angle or width but the oblique orientation of the reflection surface of the mirror relative to the rotation axis in combination with the rotation of the mirror increases the size of the effective scanning area.

In FIG. 2 and 3 the lens 11, the mirror 12 with oblique reflection surface 13, the supporting body 14 and the two setting motors 15, 16 are recognized. A feeder 18 is arranged in the center of the lens at its rear side and is directed towards the mirror 12, while a wave guide 19 connected to the feeder 18 extends through the lens for conducting energy to and from the feeder 18. As is schematically indicated in the drawing by blocks 20, 21 there is furthermore an angular transducer mounted on the shaft of each one of the motors 15 and 16. Each transducer 20, 21 measures the angle between a projectile-fixed reference direction, suitably the longitudinal axis of the projectile, and the axis O about which the mirror 11 rotates. In the present case it is assumed that the projectile in the final phase of the trajectory towards the target is stabilized as regards the rotation angle about the longitudinal axis, i.e. the rotation has been stopped and the projectile is controlled to assume a predetermined rotation angle about the longitudinal axis. This angular position is then such that one of the motors 15 tilts the rotation axis O of the mirror 12 in a lateral direction and this motor 15 can be called the side motor, while the second motor, or the height-motor, 16 tilts the rotation axis O in the height direction.

The bi-axial support of the rotatable mirror 12 is according to the invention made in the following manner. At its rear side the mirror 12 is fixedly connected to a shaft 22, which is introduced into a central bore 23 in a ballshaped bearing body 24. At its opposite end relative to the mirror 12 the shaft 22 is fastened to a drive rotor 25, which is running in a corresponding recess 26 in the spherical surface 27 of the bearing body 24. The outwardly facing side of the rotor 25 is spherically rounded in the same manner as the ball-shaped body 24. This bearing body 24 is in turn introduced into a spherically rounded, cup-shaped recess 28 in the carrier body 14. Two pairs of link arms 29, 30 and 31, 32, respectively, retain the bearing body 24 in the recess 28. The link arms serve at the same time to define two virtual turning or tilting axis for the bearing body and for this purpose the link arms in each pair are disposed with one of their ends rotatably fastened in the bearing body at two diametrically opposite situated points in height wth the center of the ball-shaped body 24. The two virtual turning axis are in the drawing designated with A1 and A2, respectively. The rotatable fastening of the arms in the bearing body 24 may for example as shown in the drawing be provided such that the arms 29, 30 and 31, 32, respectively, at the said end are terminated by a ball 33, 34 and 35, 36, respectively, which balls each are introduced into recesses 37, 38 and 39, 40, respectively, and are kept in position by means of screws 41, 42 and 43, 44, respectively. From the rotatable joint the link arms extend through conical recesses 46, 47 and 48, 49, respectively, in the bearing body 24 for allowing limited tilting of the body about the two virtual axes A1 and A2. At the opposite end the link arms in each pair are each rotatably connected to a transversal link 51, 52, which links at their central points are fastened to a shaft 53 and 54, respectively. This shaft is in turn fastened to the output shaft in the respective motor 15 and 16. In order to allow passage of one of the link arms in one of the pairs one shaft 53 is provided with a widened part 55 with a hole 56 for the link arm. It is evident that a rotation of the shafts 53 and 54 via the link arm system will cause a turning or tilting of the bearing body about the virtual axis A1 and A2. Conversely a tilting of the bearing body about the axes A1 and A2 will cause a rotation of the shaft 53 and 54, respectively.

Rotation of the mirror 11 about the axis O is maintained by air driving which is achieved in that the rotor on its outer side is provided with a helical groove pattern, i.e. grooves 125 alternating with ridges 126 running in a helix from the center to the circumference, in combination with a compressed air source in the shape of a motor-driven turbine 57, connected to an air channel 58, which terminates in the center of the recess 28. Upon commencement of a supply of air, an air stream is formed from the center to the circumference of the rotor, which will rotate the rotor and simultaneously maintain an air gap between the ball-shaped bearing body and the recess 28. The rotatable shaft 22 supporting the mirror is also air-journalled and has for this purpose a centrally extending channel 59, which on the one hand emerges in the center of the drive rotor opposite the air supply channel 58 and on the other hand emerges in the bore 23 in the bearing body via radial channels 60, 61. When compressed air is supplied through the channel 58 a portion of the air will pass through the channel 59 and via the radial channel 60 and 61 to the bore 23 and back to the gap between the bearing body and the recess 28 past the rotor, whereby an air gap is formed between the shaft 22 and the rotor, respectively, and surrounding parts of the bearing body.

In order to prevent rotation of the ball-shaped bearing body 24 relative to the carrier 14 grooves are formed in the body at two diametrically opposite points. Disposed in these grooves are guidance pins 64, 65 or the like, whereby tilting about the virtual axes A1 and A2 is allowed but rotation about axis O is prevented. At the upper side of the bearing body there are stops 66, 67 serving as support for the mirror 12 during the acceleration phase but from which stops the mirror 12 will be free when the acceleration has ceased.

At the time the projectile is fired the supporting arrangement is exposed to very high acceleration forces both in the axial direction and the radial direction. The axial and radial acceleration forces are combined to a resulting force vector, which is directed obliquely backwards in an unknown angle relative to the longitudinal axis of the projectile. The ball-shaped bearing body 24 is then pressed with its spherical surface into metallic contact with the spherical recess in the carrier body. Due to the spherical shape of the supporting device it is equally resistive in all directions and can withstand the acceleration forces without being damaged independently of the direction of the resulting force vector.

The apparatus described and shown is, on the first hand, adapted to be included in a target tracking device operating with scanning of a target zone during a first phase end, after discovery of a target, locking to the target during the last phase. During the first phase the height and side motors for the mirror are connected to signal generators, which feed suitable control voltages to the two motors, so that the mirror is brought to perform the desired, for example conical, scanning motion. At the beginning of the second phase, when the target has been found, the motors are disconnected from the signal generators and instead connected into a closed regulation loop, in which an error signal representing the deviation of the lobe produced by the mirror from the target is regulated to zero by tilting the mirror about the axes A1, A2 by means of the motors. During this last phase, guidance of the projectile towards the target is also effected. The device can then simultaneously serve as a gyroscope provided that the rotatable mirror with its rotor has a sufficiently large mass and is driven with sufficiently high speed. If the guidance for example is effected according to the line of sight bearing control principle it is required to have a measuring signal representing the angular speed of the line of sight (the line of sight from projectile to the target) in space. In an arrangement of the described type, the mirror serving as gyroscope rotor is kept locked to the target, such a signal is obtained directly as that signal which must be applied to the torque generators of the gyroscope, i.e. in the present case the setting motors of the mirror, in order to keep the mirror locked to the target. Thus in this case the arrangement serves both as an antenna or reflector in a target tracking device and as a gyroscope. Alternatively, the arrangement can, however, only serve as an adjustable antenna or reflector in a target tracking device or as a free gyroscope. The arrangement can also be used in combination with other guidance principles, for example error indication guidance or speed vector guidance.

What is claimed is:

1. An arrangement for bi-axial tiltable support of a load rotor in a projectile having a rotor housing, said arrangement upon firing of the projectile being exposed to large acceleration forces, said arrangement including means to allow said rotor to perform limited tilting or turning motions about two mutually perpendicular tilt axes lying in a plane, the tilt axes being substantially perpendicular to the longitudinal axis of the projectile, the rotation axis of the rotor substantially coinciding with the longitudinal axis of the projectile, said rotor being supported by a bearing body having at least a spherical section contour, said bearing body being disposed in a correspondingly spherically cup-shaped recess in a stationary part, said recess having an open end, said rotor being mounted on the bearing body and disposed in the recess, said rotor facing toward the motion direction of the projectile and having the bottom thereof oppositely disposed, said arrangement including means that at firing establish contact momentarily between the spherical surfaces of the recess and the bearing body, and said bearing body being connected with the projectile housing via two pairs of link arms elongated in the longitudinal direction of the projectile, each pair of link arms including first and second link arms each having first and second ends, said first end of each link arm in each pair being rotatably joined to said bearing body at two diametrically spaced points of said bearing body for defining a turning axis for said bearing body between said points, said link arms in each pair having said second ends thereof joined by motion transmitting means to a respective output shaft in such manner that rotation of the shaft is transferred to said bearing body and vice versa by longitudinal displacement of said link arms, a drive motor and an angular transducer being mounted on each shaft, and said arrangement including means for delivering compressed air to the space between the spherical surface of the bearing body and the spherical surface of the recess in order to maintain, in operation, a small gap between the said surfaces for allowing said tilting motions of the bearing body.

2. An arrangement as claimed in claim 1, wherein the means for delivering compressed air comprises a channel intersecting a face of said recess, said channel being connected to a compressed air source for maintaining an air gap between the spherical surfaces of the bearing body and the recess.

3. An arrangement as claimed in claim 2, in which said load rotor is fixedly connected to a drive rotor which is running in a corresponding recess in the spherical surface of the bearing body for cooperation with the air stream caused by said channel for maintaining rotation of the load rotor via the drive rotor, said drive rotor at the side thereof facing the spherical recess being provided with projections adapted to cooperate with an air stream in the air gap between the spherical surfaces of the bearing body and the recess caused by the compressed air for maintaining rotation of the load rotor via the drive rotor.

4. An arrangement as claimed in claim 3, wherein the projections on one side of the drive rotor are shaped as helical grooves, the air channel, where compressed air is supplied, being situated opposite substantially the center of the helical groove pattern on said drive rotor.

5. An arrangement as claimed in any of the claims 2, 3 or 4 in which the load rotor is journalled in the bearing body by means of a slide bearing consisting of a shaft running in a corresponding bore transversally through the bearing body, the shaft having an axially extending channel, said channel at one end thereof intersecting said air gap between the spherical surfaces of the bearing body and the recess, and the other end of said channel intersecting said bore for maintaining an air gap between the shaft and drive rotor and the bearing body.

6. An arrangement as claimed in any of the claims 1, 2, 3 or 4, further including means for preventing rotation of the bearing body about an axis parallel to the longitudinal axis of the projectile.

7. Use of the arrangement as claimed in any of the claims 1, 2, 3, or 4 as an adjustable antenna for electromagnetic energy in a target tracking device.

8. Use of the arrangement as claimed in any of the claims 1, 2, 3 or 4 as an adjustable reflector for electromagnetic energy in a target tracking device.

* * * * *